United States Patent
Nomura

(10) Patent No.: US 8,810,202 B2
(45) Date of Patent: Aug. 19, 2014

(54) BATTERY SYSTEM AND ITS CONTROL METHOD

(75) Inventor: Youjirou Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/818,039

(22) PCT Filed: Jun. 5, 2012

(86) PCT No.: PCT/JP2012/064462
§ 371 (c)(1),
(2), (4) Date: Feb. 20, 2013

(87) PCT Pub. No.: WO2013/011758
PCT Pub. Date: Jan. 24, 2013

(65) Prior Publication Data
US 2013/0154570 A1 Jun. 20, 2013

(30) Foreign Application Priority Data
Jul. 15, 2011 (JP) ................................. 2011-156561

(51) Int. Cl.
*H02J 7/00* (2006.01)
(52) U.S. Cl.
USPC ........................................................ 320/128
(58) Field of Classification Search
USPC ........................................................ 320/128
See application file for complete search history.

(56) References Cited

U.S. PATENT DOCUMENTS

| 2005/0105224 A1* | 5/2005 | Nishi ............................. 361/18 |
| 2011/0115292 A1 | 5/2011 | Yoneda et al. |
| 2011/0202192 A1* | 8/2011 | Kempton ..................... 700/291 |

FOREIGN PATENT DOCUMENTS

| DE | 102009040090 A1 | 3/2011 |
| JP | 2011-003449 A | 1/2011 |
| JP | 2011-050131 A | 3/2011 |
| JP | 2011-091985 A | 5/2011 |
| JP | 2012-005168 A | 1/2012 |
| WO | 2009015331 A1 | 1/2009 |

OTHER PUBLICATIONS

Extended European Search Report dated Apr. 14, 2014, issued by the European Patent Office in corresponding European Application No. 12814869.9.

* cited by examiner

*Primary Examiner* — Arun Williams
(74) *Attorney, Agent, or Firm* — Sughrue Mion, PLLC

(57) ABSTRACT

A battery system includes a battery, a control section that controls the battery to charge electric power supplied from the electrical grid and to discharge electric power to the electrical grid; and a system controller. The system controller controls the control section such that the battery system operates in a first mode where electric power that is generated by a pre-designated distributed electric power source associated with the electrical grid is supplied preferentially to a user's load or in a second mode where electric power that is charged in the battery is supplied preferentially to the user's load.

6 Claims, 4 Drawing Sheets

BATTERY SYSTEM AND ITS CONTROL METHOD

CROSS REFERENCE TO RELATED APPLICATIONS

This application is a National Stage of International Application No. PCT/JP2012/064462, filed on Jun. 5, 2012, which claims priority from Japanese Patent Application No. 2011-156561, filed Jul. 15, 2011, the contents of all of which are incorporated herein by reference in their entirety.

TECHNICAL FIELD

The present invention relates to a battery system that is operable in association with an electrical grid (commercial electric power) and to its control method.

BACKGROUND ART

In order to achieve a low carbon society, distributed electric power sources such as photo voltage generation and wind farms are becoming essential. In addition, battery systems have been implemented so as to effectively use electric power generated by distributed electric power sources and rigid power sources (for example, nuclear power plants) that emit less carbon and that stably generate electric power.

In particular, since renewable electric power sources are subject to fluctuations of output electric power that depends on weather conditions, it is preferable that they be used together with a battery system so as to relatively stably supply desired electric power to the users.

An in-house electric power generation system provided with both a distributed electric power source such as a distributed electric power source or a fuel battery and a battery is described for example in Patent Literature 1.

To accelerate the promotion of the foregoing distributed electric power sources and battery systems, it is preferred that the users be able to enjoy high economic effects when they use electric power. For example, it is preferable that the power rates of the electric grid be reduced by prioritizing the supply of electric power generated by a renewable electric power source or electric power charged to a battery system to the user's load (electric equipment). In addition, it is preferable that surplus electric power that is not used for the user's load be sold to an electric power company. However, some users prioritize the use of electric power generated from natural energy (green electric power), not economic effects. Thus, it is preferable that a renewable electric power source and a battery system be operable in an operation mode that is optimum for each user.

On the other hand, renewable electric power sources and battery systems are still expensive. Thus, the user may not implement both a renewable electric power source and a battery system at the same time. Thus, it is preferable that a renewable electric power source and a battery system be independently operable in association with the electric grid.

RELATED ART LITERATURE

Patent Literature

Patent Literature 1: Japanese Patent Laid-Open No. 2011-003449

SUMMARY

Therefore, an object of the present invention is to provide a battery system that is independently operable in association with an electric grid and in an operation mode that is optimum for each user and also to provide its control method.

To accomplish the foregoing object, a battery system according to an exemplary aspect of the present invention is a battery system that is operable in association with an electrical grid, the battery system comprising:

a battery that charges or discharges electric power;

a control section that controls said battery to charge electric power supplied from said electrical grid and to discharge electric power to said electrical grid; and a system controller that controls said control section such that said battery system operates in a first mode where electric power that is generated by a pre-designated distributed electric power source associated with said electrical grid is supplied preferentially to a user's load or in a second mode where electric power that is charged in said battery is supplied preferentially to said user's load.

On the other hand, a control method for a battery system according to an exemplary aspect of the present invention is a control method for a battery system that is operable in association with an electrical grid, the battery system including:

a battery that charges or discharges electric power; and a control section that controls said battery to charge electric power supplied from said electrical grid and to discharge electric power to said electrical grid, the control method comprising:

causing a computer to control said control section such that said battery system operates in a first mode where electric power generated by a pre-designated distributed electric power source associated with said electrical grid is supplied preferentially to a user's load or in a second mode where electric power that is charged in said battery is supplied preferentially to said user's load.

EXEMPLARY EMBODIMENT

Next, with reference to the accompanying drawings, the present invention will be described.

Figure 1:
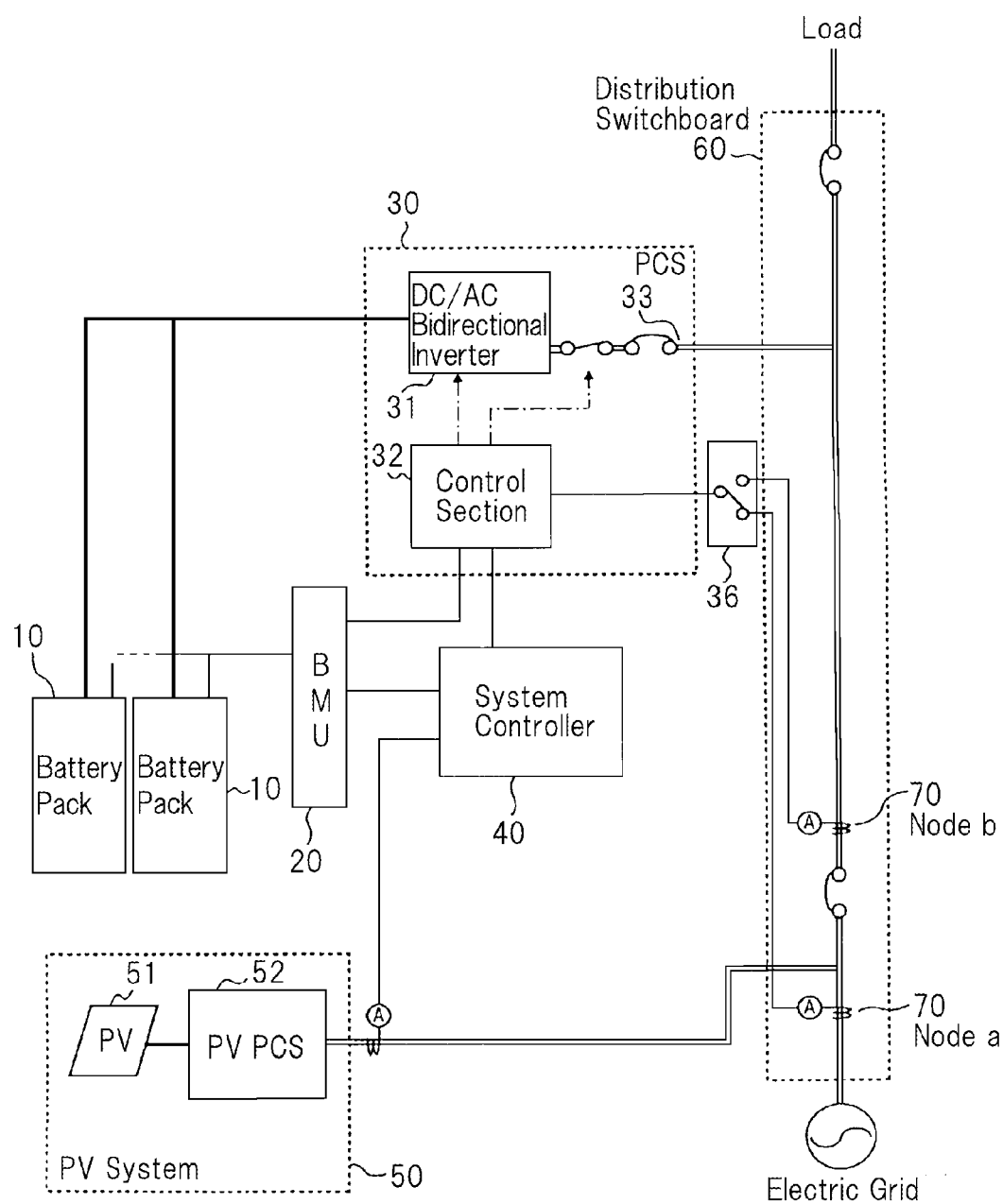
FIG. 1 is a block diagram showing an example of the structure of a battery system according to the present invention.

FIG. 1 is a block diagram showing an example of the structure of a battery system according to the present invention.

As shown in FIG. 1, the battery system has battery pack 10 that charges or discharges electric power; BMU (Battery Management Unit) 20 that protects battery pack 10 from overcharging, overdischarging, over current, and so forth; power conditioner (PCS) 30 that converts electric power such that battery pack 10 is operable in association with the electric grid and that controls charging of electric power to battery pack 10 and discharging electric power therefrom; and system controller 40 that controls the overall operations of the battery system including BMU 20 and PCS 30. Although FIG. 1 shows an example of the structure in which two battery packs 10 are connected in parallel, it should be appreciated that one battery pack 10 or three or more battery packs 10 may be used.

The electrical grid is used in association with both PV system 50 and the battery system. PV system 50 has PV (Photo Voltaic) panel 51 that uses solar light to generate electric power and PV power conditioner (PV PCS) 52 that converts DC electric power generated by PV panel 51 into AC electric power that can be supplied to the electrical grid. PV system 50 is a distributed electric power source (small power generation facility) that is independent from the battery system. The battery system and PV system 50 are operated in association with the electrical grid through a distribution board located in the user's house.

Power conditioner 30 is provided with DC/AC bidirectional inverter 31 that converts AC electric power supplied from the electrical grid to DC electric power that can be charged to battery pack 10 and converts DC electric power discharged from battery pack 10 into AC electric power that can be supplied to the load and the electrical grid; and control section 32 that controls the operation of power conditioner 30 including DC/AC bidirectional inverter 31 corresponding to a command issued from system controller 40 and that monitors the operation of BMU 20. Power conditioner 30 shown in FIG. 1 is operable in association with the electrical grid through electric power line 33 such that power conditioner 30 supplies electric power to the user's load through electric power line 33.

Battery pack 10 is provided with a battery (secondary battery) that can charge or discharge electric power. The battery is, for example, a lithium ion rechargeable battery, a nickel cadmium (NI—Cd) battery, or a nickel hydrogen (Ni—MH) battery. Battery pack 10 contains one battery or a plurality of batteries that are connected in series depending on the desired output voltage. The battery system contains one battery or a plurality of batteries that are connected in parallel depending on the desired charging amount. The battery system according to the present invention may be provided for example with a metal case type battery (secondary battery). It should be appreciated that the battery system according to the present invention is provided with a metal case type battery (secondary battery).

BMU 20 can be realized by an electronic circuit containing a known protection IC (Integrated Circuit) and various types of electronic devices corresponding to the battery or batteries of battery pack 10.

DC/AC bidirectional inverter 31 can be realized by a DC/AC inverter circuit, an AC/DC converter circuit, a DC/DC converter, a relay (switch) that switches between electrical paths, or the like, each of which is known.

Control section 32 can be realized by an electronic circuit composed of a known communication circuit that transmits and receives information to and from system controller 40; a known current-to-electric power conversion circuit that receives a current value from current sensor 70 that detects the current value (current sensor 70 will be described later) and converts the current value into an electric power value; and a known logic circuit that outputs a control signal that causes the operations of BMU 20, DC/AC bidirectional inverter 31, and so forth to be switched corresponding to a command issued from system controller 40. FIG. 1 shows an example of the structure in which control section 32 is located in power conditioner 30. However, it should be appreciated that control section 32 may be a unit that is independent from power conditioner 30 or a unit that is located in system controller 40.

System controller 40 can be realized by an information processing unit (computer) that is provided with a CPU, a storage unit, various types of logic circuits, and a communication means that transmits and receives information to and from control section 32, BMU 20, and DC/AC bidirectional inverter 31. System controller 40 executes a process corresponding to a program stored in the storage unit so as to operate the battery system. The operation of the battery system will be described later.

Distribution switchboard 60 is provided with a plurality of branch electrical paths (not shown) through which electric power is supplied from the electrical grid to the user's load and which has switches corresponding to individual electrical grids and individual branch electrical paths.

The battery system according to this embodiment is provided with current sensors 70 each of which is located on the electrical path through which electric power is supplied from the electrical grid to the load and on the output electrical path of PV system 50. Electric power supplied from the electrical grid to the user's load and output electric power of PV system 50 are measured based on the current values detected by current sensors 70. Electric power supplied from the electrical grid to the user's load is measured by control section 32 of power conditioner 30. Output electric power of PV system 50 is measured by system controller 40. However, electric power supplied from the electrical grid to the user's load is measured both on the electrical grid side (node a shown in FIG. 1) and the user's load side (node b shown in FIG. 1) viewed from the association point of PV system 50. Thus, power conditioner 30 is provided with switch 36 that changes over between the connection of current sensor 70 at node a and control section 32 and the connection of current sensor 70 at node b and control section 32. System controller 40 operates switch 36.

FIG. 1 shows an example of the structure in which the battery system is used together with PV system 50. However, the battery system according to the present invention can perform the foregoing control even if the battery system is used together with a distributed electric power source that is an in-house electric power generator that uses a wind farm electric power generation system, a fuel battery, or fossil energy.

In this structure, PV system 50 generates electric power basically depending on weather conditions rather than the total electric power consumption of the user's load and outputs the generated electric power. Thus, if the total electric power consumption becomes low, surplus electric power that is not used for the load is generated by PV system 50. The surplus electric power that is not used for the load is caused to reversely flow to the electrical grid. Alternatively, the surplus electric power is charged to battery pack 10 through DC/AC bidirectional inverter 31 under the control of system controller 40.

Battery pack 10 discharges charged electric power in response to a control signal issued by control section 32 and supplies electric power to the user's load through DC/AC bidirectional inverter 31. Presently, in Japan, it is not permitted that electric power discharged from battery pack 10 is caused to reversely flow to the electrical grid. Thus, if the total electric power consumption of the load is low, the amount of electric power discharged from battery pack 10 is suppressed.

Battery pack 10 is charged with the foregoing surplus electric power of PV system 50 or electric power supplied from the electrical grid. Electric power may be charged to or discharged from battery pack 10 by the user at his or her convenience. When battery pack 10 is charged with electric power supplied from the electrical grid, nighttime electric power that is inexpensive compared to regular electric power can be used.

The battery system according to this embodiment is provided with two operation modes in which electric power is supplied to the user's load, a PV priority mode (first mode) in which electric power generated by PV system 50 is prioritized and a charging priority mode (second mode) in which electric power charged to battery pack 10 is prioritized.

In the PV priority mode, the measured value at node a shown in FIG. 1 is used as electric power $P_{GRID}$ supplied from the electrical grid to the load. In the charging priority mode, the measured value at node b shown in FIG. 1 is used as electric power $P_{GRID}$ supplied from the electrical grid to the load.

Assuming that the total electric power consumption (load electric power) of the user's load is denoted by $P_{LOAD}$, the electric power supplied from battery pack 10 to the electrical grid through power conditioner 30 is denoted by $P_{INV}$, and the electric power supplied from PV system 50 to the electrical grid is denoted by $P_{PV}$, in the PV priority mode, the relationship of $P_{LOAD}=P_{GRID}+P_{PV}+P_{INV}$ is obtained. In contrast, in the charging priority mode, the relationship of $P_{LOAD}=P_{GRID}+P_{INV}$ is obtained. In other words, in the PV priority mode, $P_{GRID}=P_{LOAD}-(P_{PV}+P_{INV})$ is measured. In the charging priority mode, $P_{GRID}=P_{LOAD}-P_{INV}$ is measured.

In the PV priority mode, system controller 40 causes electric power that is output from PV system 50 to be supplied preferentially to the load. If electric power generated by PV system 50 does not satisfy electric power supplied to the load ($P_{LOAD}-P_{PV}>0$), system controller 40 causes battery pack 10 to discharge electric power through power conditioner 30 and supply the electric power to the load. If electric power generated by PV system 50 is equal to or greater than electric power supplied to the load ($P_{LOAD}-P_{PV}<0$), system controller 40 causes surplus electric power that is not used in the load to reversely flow to the electrical grid or to be charged to battery pack 10.

In the charging priority mode, system controller 40 causes electric power that is charged in battery pack 10 to be supplied preferentially to the load. If electric power discharged from battery pack 10 does not satisfy electric power supplied to the load ($P_{LOAD}-P_{INV}>0$), system controller 40 causes electric power generated by PV system 50 to be supplied to the load. If electric power discharged from battery pack 10 is equal to or greater than electric power supplied to the load or if it is not necessary to supply all electric power generated by PV system 50 to the load, system controller 40 causes surplus electric power that is not used in the load to reversely flow to the electrical grid or to be charged to battery pack 10.

Moreover, the battery system according to this embodiment is provided with an economy mode (third mode) and a green mode (fourth mode) for the charging priority mode and for the PV priority mode. In the economy mode, economy is prioritized; in the green mode, charging to the battery is prioritized.

In the economy mode, system controller 40 causes surplus electric power that is generated by PV system 50 to be sold preferentially to the electric power company. In the green mode, system controller 40 causes surplus electric power that is generated by PV system 50 to be charged preferentially to battery pack 10. The PV priority mode, the charging priority mode, the economy mode, and the green mode can be set by the user using switches or the like located on the operation panel (not shown) and data that represents the mode that has been set is stored in the storage unit of system controller 40.

Next, with reference to the accompanying drawings, the operation of the battery system shown in FIG. 1 will be described.

Figure 2:
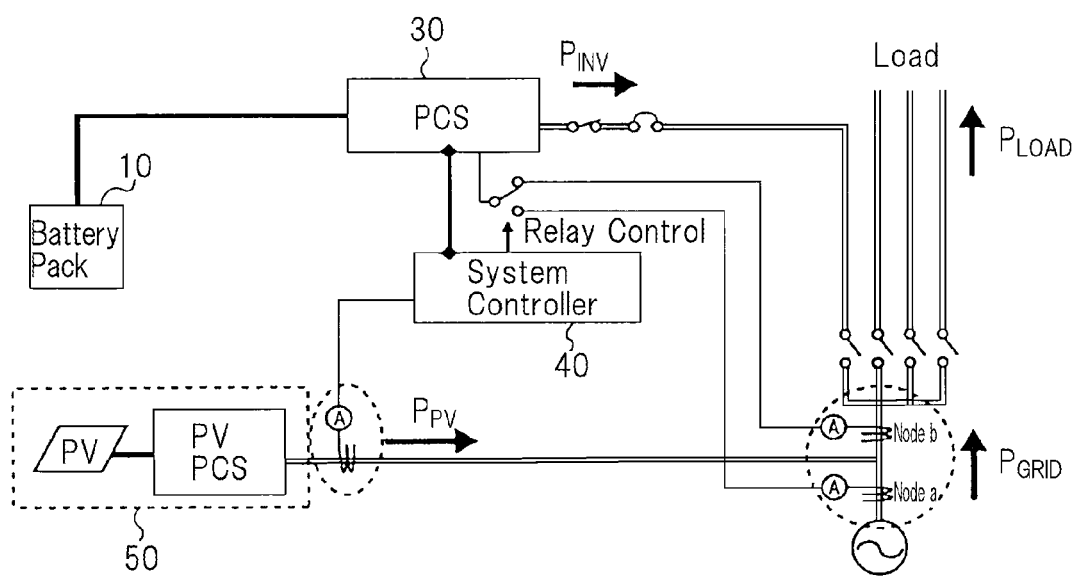
FIG. 2 is a block diagram showing the structure of principal sections of the battery system shown in FIG. 1.

FIG. 2 is a block diagram showing the structure of principal sections of the battery system shown in FIG. 1.

Figure 3:
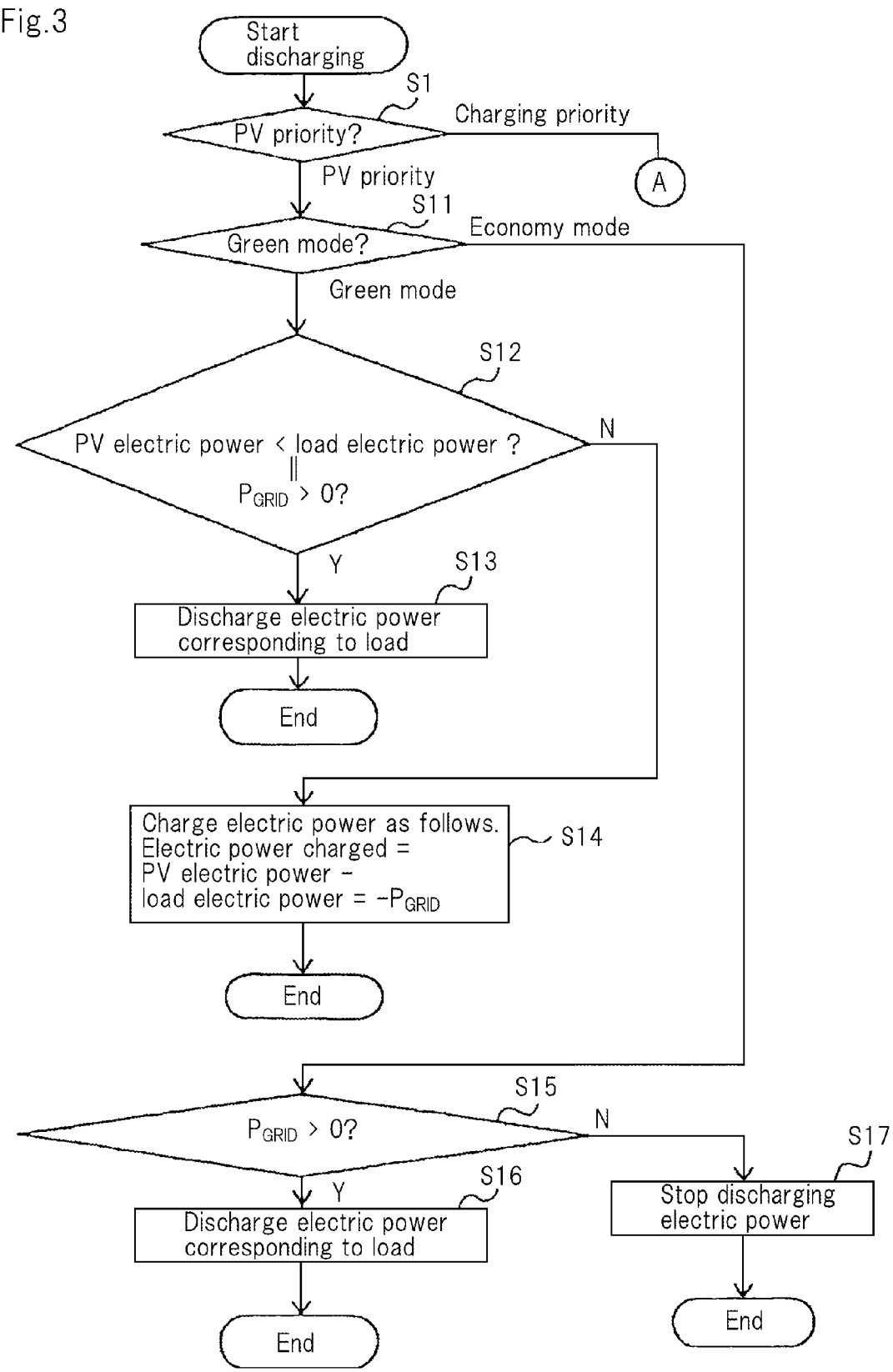
FIG. 3 is a flow chart showing an example of a process in which the battery system shown in FIG. 2 performs in a PV priority mode.
Figure 4:
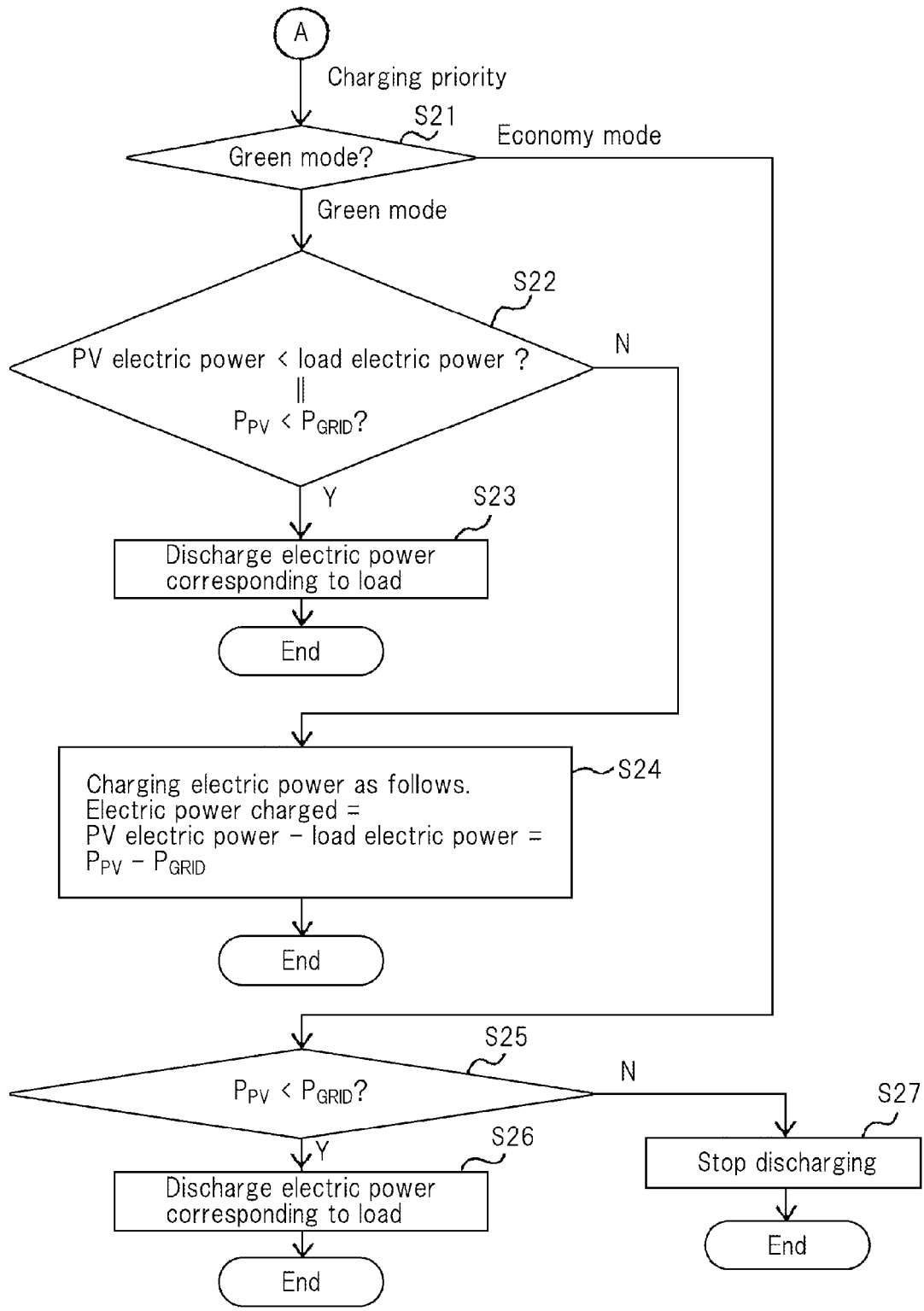
FIG. 4 is a flow chart showing an example of a process in which the battery system shown in FIG. 2 performs in a charging priority mode.

FIG. 3 is a flow chart showing an example of a process in which the battery system shown in FIG. 2 performs in the PV priority mode. FIG. 4 is a flow chart showing an example of a process in which the battery system shown in FIG. 2 performs in the charging priority mode.

FIG. 2 shows principal sections related to the operations in which the battery system and PV system 50 perform in the PV priority mode and the charging priority mode. In addition, arrows of $P_{GRID}$, $P_{LOAD}$, $P_{INV}$, and $P_{PV}$ shown in FIG. 2 represent the directions in which currents flow in the forward direction.

FIG. 1 and FIG. 2 show an example of the structure in which current sensors 70 are located at node a and node b. As described above, the difference between the measured result at node a and the measured result at node b is whether or not the measured result contains $P_{PV}$. On the other hand, current sensor 70 is located on the output electrical path of PV system 50 and the value of $P_{PV}$ is measured by system controller 40. Thus, even if current sensor 70 is located either at node a or node b, the battery system according to this embodiment can be controlled.

The processes shown in FIG. 3 and FIG. 4 are executed by system controller 40. Electric power $P_{GRID}$ supplied from the electrical grid to the load is measured by control section 32 of the power conditioner and then transmitted from control section 32 to system controller 40.

As shown in FIG. 3, when the battery system starts discharging electric power, system controller 40 determines whether the battery system is operating in the PV priority mode or in the charging priority mode (at step S1). If system controller 40 is operating in the charging priority mode, the flow advances to the process shown in FIG. 4.

If the battery system is operating in the PV priority mode, system controller 40 determines whether the battery system is operating in the green mode or in the economy mode (at step S11).

If the battery system is operating in the green mode, system controller 40 determines whether or not total electric power consumption in the load (load electric power $P_{LOAD}$) is greater than electric power generated by PV system 50 (PV electric power $P_{PV}$), namely whether electric power $P_{GRID}$ supplied from the electrical grid to the load is greater than 0 (at step S12).

If $P_{GRID}$ is greater than 0, system controller 40 controls power conditioner 30 so as to discharge electric power from battery pack 10 corresponding to load electric power $P_{LOAD}$ and to supply supplementary electric power ($P_{LOAD}-P_{PV}$) to the load (at step S13).

If $P_{GRID}$ is 0 or less, system controller 40 causes surplus electric power ($P_{PV}-P_{LOAD}=-P_{GRID}$) that is not used in the load of electric power generated by PV system 50 to be charged to battery pack 10 (at step S14). However, if battery pack 10 has been fully charged, system controller 40 causes surplus electric power to reversely flow to the electrical grid so as to sell the surplus electric power to the electric power company or the like.

If the battery system is operating in the economy mode, system controller 40 determines whether or not total electric power consumption in the load (load electric power $P_{LOAD}$) is greater than electric power generated by $P_V$ system 50 (PV electric power $P_{PV}$), namely whether electric power $P_{GRID}$ supplied from the electrical grid to the load is greater than 0 (at step S15).

If $P_{GRID}$ is greater than 0, system controller 40 controls power conditioner 30 so as to discharge electric power from battery pack 10 corresponding to load electric power $P_{LOAD}$ and to supply supplementary electric power ($P_{LOAD}-P_{PV}$) to the load (at step S16).

If $P_{GRID}$ is 0 or less, system controller 40 causes battery pack 10 to stop discharging electric power (at step S17). In this case, system controller 40 causes surplus electric power ($P_{PV}-P_{LOAD}=-P_{GRID}$) that is not used in the load of electric power generated by PV system 50 to reversely flow to the electrical grid and causes the surplus electric power to be sold to the electric power company or the like.

If the battery system is operating in the charging priority mode as shown in FIG. 4, system controller 40 determines whether or not the battery system is operating in the green mode or in the economy mode (at step S21).

If the battery system is operating in the green mode, system controller 40 determines whether or not total electric power consumption in the load (load electric power $P_{LOAD}$) is greater than electric power generated by PV system 50 (PV electric power $P_{PV}$), namely whether electric power $P_{GRID}$ supplied from the electrical grid to the load is greater than $P_{PV}$ (at step S22).

If $P_{GRID}$ is greater than $P_{PV}$, system controller 40 controls power conditioner 30 so as to discharge electric power from battery pack 10 corresponding to load electric power $P_{LOAD}$ and to supply supplementary electric power ($P_{LOAD}-P_{PV}$) to the load.

If $P_{GRID}$ is equal to or less than $P_{PV}$ or less, system controller 40 causes surplus electric power ($P_{PV}-P_{LOAD}=P_{PV}-P_{GRID}$) that is not used in the load of electric power generated in PV system 50 to be charged to battery pack 10 (at step S24). However, if battery pack 10 has been fully charged, system controller 40 causes the surplus electric power to reversely flow to the electrical grid and the electric power to be sold to the electric power company or the like.

If the battery system is operating in the economy mode, system controller 40 determines whether or not the total electric power consumption in the load (load electric power $P_{LOAD}$) is greater than the electric power generated by PV system 50 (PV electric power $P_{PV}$), namely electric power $P_{GRID}$ supplied from the electrical grid to the load is greater than $P_{PV}$ (at step S25).

If $P_{GRID}$ is greater than $P_{PV}$, system controller 40 controls power conditioner 30 so as to discharge electric power from battery pack 10 corresponding to load electric power $P_{LOAD}$ and supply supplementary electric power ($P_{LOAD}-P_{PV}$) to the load (at step S26).

If $P_{GRID}$ is equal to or less than $P_{PV}$, system controller 40 causes battery pack 10 to stop discharging electric power (at step S27). In this case, system controller 40 causes surplus electric power that is not used in the load ($P_{PV}-P_{LOAD}=P_{PV}-P_{GRID}$) of electric power generated in PV system 50 to reversely flow to the electrical grid and the electric power to be sold to the electric power company or the like.

According to this embodiment, battery pack 10 and power conditioner 30 that controls battery pack 10 to charge or discharge electric power can be operated in association with the electrical grid and independent from a distributed power source such as PV system 50. Even if a distributed electric power source has been implemented, the battery system can be operated in association with the electrical grid.

Moreover, in the battery system according to this embodiment, if the battery pack is charged with nighttime electric power that is relatively inexpensive and if the battery system is operated during the daytime either in the charging priority mode or the PV priority mode, since electric power supplied from the electrical grid during the daytime is prevented, electric rates can be reduced. At this point, if the battery system is operated in the charging priority mode, since surplus electric power that occurs in the PV system becomes relatively large, the amount of electric power that is sold increases. If the battery system is operated in the PV priority mode, electric power generated by the PV system can mostly satisfy electric power for the user's load. Thus, a battery system can be accomplished with high economic benefits.

Whether a higher economic benefit can be obtained in the charging priority mode or the PV priority mode in which the battery system operates depends on, for example, the amount of electric power used by the user, his or her electric power use pattern, and weather conditions (sunlight hours, wind force, and so forth) of the region where he or she lives. In addition, some users may prioritize the use of electric power that is generated from natural energy (green electric power), rather than high economic benefits.

The battery system according to this embodiment can switch between the foregoing charging priority mode and the PV priority mode. In addition, the battery system can switch between the economy mode and the green mode. Thus, the user can optimally select an operation mode in which the battery system operates based upon the preference of the user (i.e. green or economy mode) and so forth.

Thus, the battery system can be operated in association with the electrical grid, but independent from a distributed electric power source. As a result, a battery system that can be operated in a mode that satisfies the preference of each user can be realized.

With reference to the embodiments, the present invention has been described. However, it should be understood by those skilled in the art that the structure and details of the present invention may be changed in various manners without departing from the scope of the present invention.

This application claims priority of Japanese Patent Application No. 2011-156561 filed on Jul. 15, 2011, the disclosures of which are incorporated herein by reference.

The invention claimed is:

1. A battery system that is operable in association with an electrical grid, the battery system comprising:
   a battery that charges or discharges electric power;
   a control section that controls said battery to charge electric power supplied from said electrical grid and to discharge electric power to said electrical grid;
   a system controller that controls said control section such that said battery system operates in a first mode where electric power that is generated by a pre-designated distributed electric power source associated with said electrical grid is supplied preferentially to a user's load or in a second mode where electric power that is charged in said battery is supplied preferentially to said user's load; and
   first electric power measurement means that measures electric power supplied to said user's load on said electrical grid side rather than an association point of said distributed electric power source,
   wherein said system controller controls said control section such that said battery discharges electric power to said electrical grid if electric power measured by said first electric power measurement means is greater than 0 while said battery system is operating in said first mode.

2. The battery system according to claim 1,
   wherein said system controller controls said control section such that said battery system operates in a third mode where surplus electric power that is generated by said pre-designated distributed electric power source is sold preferentially or in a fourth mode where surplus electric power that is generated by said distributed electric power source is charged preferentially to said battery while said system controller is operating in said first mode or said second mode.

3. The battery system according to claim 1, further comprising:
    second electric power measurement means that measures electric power supplied to said user's load on said user's load side rather than the association point of said distributed electric power source; and third electric power measurement means that measures output electric power of said distributed electric power source,
    wherein said system controller controls said control section such that said battery discharges electric power to said electrical grid if electric power measured by said second electric power measurement means is greater than electric power measured by said third electric power measurement means while said battery system is operating in said second mode.

4. A control method for a battery system that is operable in association with an electrical grid, the battery system including:
    a battery that charges or discharges electric power; and
    a control section that controls said battery to charge electric power supplied from said electrical grid and to discharge electric power to said electrical grid,
    the control method comprising:
    causing a computer to control said control section such that said battery system operates in a first mode where electric power that is generated by a pre-designated distributed electric power source associated with said electrical grid is supplied preferentially to a user's load or in a second mode where electric power that is charged in said battery is supplied preferentially to said user's load,
    wherein said battery system also includes first electric power measurement means that measures electric power supplied to said user's load on said electrical grid side rather than an association point of said distributed electric power source,
    wherein said control method further comprises:
    causing said computer to control said control section such that said battery discharges electric power to said electrical grid if electric power measured by said first electric power measurement means is greater than 0 while said battery system is operating in said first mode.

5. The control method for the battery system according to claim 4, further comprising:
    causing said computer to control said control section such that said battery system operates in a third mode where surplus electric power that is generated by said pre-designated distributed electric power source is sold preferentially or in a fourth mode where surplus electric power that is generated by said distributed electric power source is charged preferentially to said battery while said system controller is operating in said first mode or said second mode.

6. The control method for the battery system according to claim 4,
    wherein said battery system also includes second electric power measurement means that measures electric power supplied to said user's load on said user's load side rather than the association point of said distributed electric power source and third electric power measurement means that measures output electric power of said distributed electric power source, and
    wherein said control method further comprises:
    causing said computer to compare electric power measured by said second electric power measurement means with electric power measured by said third electric power measurement means while said battery system is operating in aid second mode; and
    causing said computer to control said control section such that said battery discharges electric power to said electrical grid if electric power measured by said second electric power measurement means is greater than electric power measured by said third electric power measurement means while said battery system is operating in said second mode.

* * * * *